United States Patent [19]
Graf et al.

[11] 3,800,198
[45] Mar. 26, 1974

[54] PROTECTION MEANS FOR PREVENTING OVERVOLTAGE AND UNDERVOLTAGE CONDITIONS IN POWER CIRCUITS

[75] Inventors: Carlton Eugene Graf; Einar Aasen Skogsholm, both of Erie, Pa.

[73] Assignee: General Electric Company, Erie, Pa.

[22] Filed: Aug. 16, 1971

[21] Appl. No.: 172,122

[52] U.S. Cl. ............... 318/227, 317/31, 318/230, 321/5, 321/14, 321/45 C
[51] Int. Cl. .......................................... H02p, H02m
[58] Field of Search ............... 321/5, 11, 12–14, 321/18, 45 C; 318/227, 230, 231; 317/31

[56] References Cited
UNITED STATES PATENTS

| | | | |
|---|---|---|---|
| 3,679,964 | 7/1972 | Nowell | 321/11 |
| 3,683,264 | 8/1972 | Schieman et al. | 321/5 |
| 3,407,338 | 10/1968 | Secunde | 317/31 X |
| 2,200,085 | 5/1940 | Hildebrand | 317/31 X |
| 3,394,299 | 7/1968 | Lann et al. | 321/14 X |
| 3,593,103 | 7/1971 | Chandler | 318/227 X |

*Primary Examiner*—William H. Beha, Jr.
*Attorney, Agent, or Firm*—George R. Powers; Arnold E. Renner; Harold H. Green, Jr.

[57] ABSTRACT

An electrical power system includes power conversion apparatus for receiving electric power from a source and supplying the electric power in converted form to a load and control apparatus for automatically stopping the operation of the power conversion apparatus in response to the departure of a selected operating parameter, such as input voltage to the power conversion apparatus, from a preestablished range having upper and lower limits. A signal representative of the operating parameter is sensed and utilized to produce an out-of-range signal only when the operating parameter departs from the preestablished range, the out-of-range signal being utilized in turn to stop the operation of the power conversion apparatus.

11 Claims, 2 Drawing Figures

INVENTORS
CARLTON E. GRAF
EINAR A. SKOGSHOLM
BY George R. Powers
THEIR ATTORNEY

3,800,198

PROTECTION MEANS FOR PREVENTING OVERVOLTAGE AND UNDERVOLTAGE CONDITIONS IN POWER CIRCUITS

BACKGROUND OF THE INVENTION

1. Field of the Invention

This invention relates to protection means for power conversion circuits such as inverter circuits for a-c adjustable speed drive systems and, more particularly, to control means for promptly detecting the departure of voltage from a pre-established range and automatically responding to overvoltage and undervoltage conditions by causing the operation of the power conversion circuit to be stopped in an orderly fashion.

2. Description of the Prior Art

This invention is particularly applicable to the protection inverter power circuits in drive systems of the general type disclosed and claimed by copending patent application Ser. No. 81,758, titled "Adjustable Speed Polyphase A-C Motor Drive," filed on Oct. 19, 1970, in the names of Carlton E. Graf and Werner K. Volkmann, and by copending patent application Ser. No. 81,757, titled "Synchronous Time Ratio Control Power Regulator," filed on Oct. 19, 1970, in the name of Carlton E. Graf, both applications being assigned to the assignee of this invention. While the present invention will be described herein in connection with a drive system of the type taught by the aforesaid patent applications to the extent necessary for a full and complete understanding of the invention, a more complete understanding of such inverter circuits may be obtained from the aforesaid patent applications and U.S. Pat. No. 3,207,974 to McMurray, also assigned to the assignee of this invention.

In inverter power circuits of the type taught by the aforesaid patent references, the apparatus for changing d-c electric power to adjustable frequency a-c electric power, and for changing a-c power to d-c power during operation in a regenerative mode, includes a number of series circuits connected in parallel across a d-c source. Each of the series circuits includes a pair of thyristor devices, or gate controlled rectifiers, such as silicon controlled rectifiers. As will become apparent as this description proceeds, these thyristors are "fired" or turned "on" and commutated "off" by suitable control apparatus in a prescribed sequence so as to produce the desired power conversion. It is highly desirable that the d-c voltage existing during operation of the power conversion apparatus be maintained within a pre-established range having upper and lower limits. More particularly, the voltage should be maintained below the level at which individual inverter components, including the thyristors, commutating capacitors, and the like, are subjected to excessive and potentially destructive voltages. Similarly, the d-c voltage should be maintained at a level high enough to assure proper commutation of the thyristors. If the voltage were to drop to a level insufficient to support commutation, the result would be simultaneous conduction of both thyristors in a single series circuit. This "shoot-through" would result in turn in a rapidly rising current and possible damage to the inverter components. It is, therefore, highly desirable that the d-c voltage level be monitored in inverter power systems and that appropriate action be taken automatically to protect against the potentially adverse effects of overvoltage and undervoltage operation.

SUMMARY OF THE INVENTION

It is, therefore, an object of this invention to provide improved means for protecting thyristors and other power circuit elements against potentially destructive conditions resulting from overvoltage or undervoltage operation.

Another object of this invention is to provide means for automatically protecting thyristors and other circuit elements against excessive voltage and current levels resulting from overvoltage or undervoltage operation.

Another object is to provide means for detecting overvoltage or undervoltage operation and causing the operation of an inverter to be stopped in an orderly manner.

A further object is to provide in an inverter means for monitoring a selected operating parameter and causing the operation of an inverter to be stopped or otherwise altered whenever the selected operating parameter departs from a pre-established range.

A still further object is to provide protective means in accordance with the foregoing objects which is relatively simple, reliable, and inexpensive.

Briefly stated, in carrying out the invention in one form, an electrical system includes power conversion means for receiving electric power from a source and supplying the electric power in changed form to a load and control means for automatically stopping the operation of the power conversion means in response to the departure of a selected operating parameter, preferably voltage, from a pre-established range having upper and lower limits. The control means includes first means coupled to the electrical system for generating an electrical signal representative of the selected operating parameter, second means coupled to the first means and responsive to the signal produced by the first means to generate an out-of-range signal when the operating parameter falls outside of the pre-established range, and third means coupled to the second means and the power conversion means and responsive to an out-of-range signal to stop the operation of the power conversion means.

By a further aspect of the invention, the second means includes overlimit signal generating means for generating an overlimit signal only when the operating parameter is greater than the upper limit of the pre-established range, underlimit signal generating means for generating an underlimit signal only when the operating parameter is less than the lower limit of the pre-established range, and summing means coupled to the overlimit and underlimit signal generating means for supplying an out-of-range signal to the third means when and only when an overlimit or underlimit signal is supplied thereto. By a still further aspect of the invention, the third means includes signal generating means for producing and supplying to the power conversion means an "operate" signal in the absence of an "out-of-range" signal and a "stop" signal in the presence of an "out-of-range" signal.

BRIEF DESCRIPTION OF THE DRAWING

While the novel features of this invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
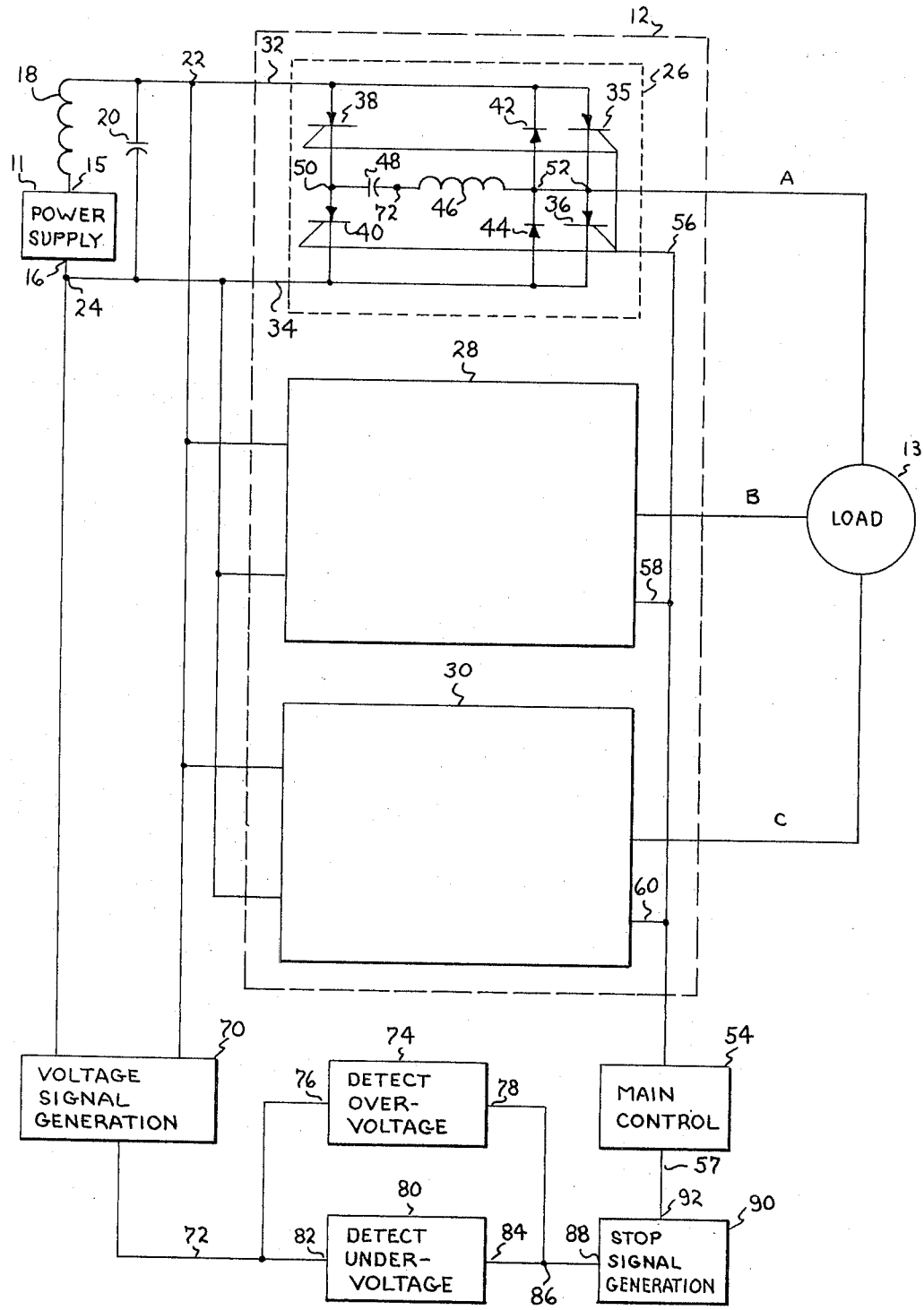
FIG. 1 is a block diagram of an a-c drive system including voltage control means in accordance with the present invention.

The a-c drive system shown in FIG. 1, in block diagram form, includes a d-c power supply 11, power conversion apparatus 12, and a load 13 which is preferably an a-c polyphase motor. The d-c power supply 11 is typically energized from a commercially available source of three-phase alternating current electric potential, and, therefore, provides a pulsating d-c potential between its output terminals 15 and 16 that is filtered or smoothed by a suitable filter network including a filter inductor 18 and a shunt connected filter capacitor 20. Accordingly, relatively smooth d-c potential is supplied to the input terminals 22 and 24 of the power conversion apparatus when electric power is being supplied thereto from the source 11. It will, of course, be readily apparent that the source 11 could be a battery or other source of d-c potential, or even a source of a-c potential. The purpose of the power conversion apparatus 12 is to convert the electric power supplied thereto into another form, whether it be a d-c to a-c transformation, an a-c to d-c transformation (regeneration), or an a-c to another form of a-c transformation.

As indicated, the load 13 is preferably a three-phase motor supplied with variable frequency, variable voltage electric power from the power conversion apparatus 12 over phase conductors A, B and C. The power conversion apparatus 12 includes an inverter circuit for each phase A, B and C, the inverter circuits, respectively, being indicated by the reference numerals 26, 28 and 30. The inverter circuit 26 for Phase A includes a positive bus 32 connected to the electrical junction 22 between the inductor 18 and the capacitor 20 and a negative bus 34 connected to the negative terminals 24 and 16. The inverter circuit 26 includes a pair of load current carrying gate controlled rectifiers 35 and 36 connected in series between the positive bus 32 and the negative bus 34 with the anode of rectifier 35 connected to the positive bus 32. Gate controlled rectifiers 38 and 40 are also connected in series between the buses 32 and 34 with the same polarity as the gate controlled rectifiers 35 and 36. The gate controlled rectifiers 35, 36, 38 and 40 are preferably silicon controlled rectifiers, but it will be obvious that functionally equivalent devices such as gaseous thyratrons can be used. Diode rectifiers 42 and 44 are connected to parallel the controlled rectifiers 35 and 36, respectively, in reverse polarity, and an inductance 46 and a capacitor 48 are connected in series between the junction 50 of the gate controlled rectifiers 38 and 40 and the junction 52 of the gate controlled rectifiers 35 and 36 and the diode rectifiers 42 and 44. Phase A of the motor 13 is connected to the junction 52 for receiving alternating current from the inverter circuit 26. Inverter circuits 28 and 30 for supplying alternating current to Phases B and C, respectively, are identical in physical structure and mode of connection to the d-c source 11 to the inverter circuit 26.

As illustrated by FIG. 1, main control apparatus 54 is provided for turning on the gate controlled rectifiers 35, 36, 38 and 40 of the inverter circuit of Phase A by means of firing signal pulses supplied through connections 56. Similar signal pulses are also supplied through connections 58 and 60 to the gate controlled rectifiers of the circuits 28 and 30. The main control apparatus 54 is responsive to various input signals including "operate" and "stop" signals generated in accordance with this invention and supplied on conductor 57.

As this description proceeds, it will become clear that the apparatus of this invention produces an "operate" signal so long as the voltage or other selected operating parameter is within an acceptable range. Under such conditions, the rectifiers of the inverter circuits 26, 28 and 30 are operated in accordance with the control apparatus described by the aforesaid patent applications and the said McMurray patent. If, however, a "stop" signal is generated in accordance with the invention and supplied on conductor 57, the normal operation of the control apparatus will be overridden, and the power conversion apparatus 12 will stop operation.

Before turning attention to the voltage control apparatus of this invention, the general mode of operation of the drive system of FIG. 1 will be described. It should be borne in mind that the basic function of the inverter circuits 26, 28 and 30 is to transform d-c power from the source 11 to a-c power for delivery through Phases A, B and C to the motor 13. To accomplish this in Phase A, the gate controlled rectifier 35 and the gate controlled rectifier 36 of circuit 26 conduct alternately for time periods established by the main control apparatus 54. The fundamental frequency at which changes in conduction occur is controlled by the main control apparatus 54 and firing signal pulses which it caused to be supplied to the gate controlled rectifiers of the circuit 26. The manner in which conduction is initiated and stopped is known as commutation and now will be described briefly with respect to Phase A and the inverter circuit 26.

Initially, let it be assumed that the main controlled rectifier 35 is conducting current to the motor 13. As a result of previous operation, the capacitor 48 is charged such that a point 72 between the capacitor 48 and the inductor 46 is positive in potential with respect to the junction 50. To commutate the controlled rectifier 35 "off," the commutating controlled rectifier 38 is turned "on," as by receiving a firing signal pulse from the control apparatus 54 through connection 56. A series oscillatory circuit comprising the commutating capacitor 48 and the commutating inductor 46 is now connected across the load current carrying controlled rectifier 35. A current pulse produced by the discharging series oscillatory circuit takes over the function of supplying load current to the motor 13 and causes the diode 42 to be forward biased. As a result, the current through the controlled rectifier 35 is reduced to zero. The feedback diode 42 conducts excess commutation current around the controlled rectifier 35 and provides a limited reverse bias across the controlled rectifier 35. This reverse bias lasts for a period greater than the turn-off time of the controlled rectifier 35 so that this controlled rectifier is caused to turn "off," i.e., to regain its blocking mode of operation.

After the commutating capacitor 48 has been charged to the opposite polarity, so that the junction 50 is more positive in potential than the positive bus 28, the commutating controlled rectifier 38 turns off. Since the controlled rectifier 35 is now turned off, reactive current circulates through the opposite feedback diode 44. The main controlled rectifier 36 can be fired at this time by applying a firing signal to its gate electrode through connection 56. The commutating capacitor 48 thereafter has the appropriate polarity to commutate "off" this controlled rectifier when the commutating controlled rectifier 40 is turned on. After the controlled rectifiers 36 and 40 are turned "off" to thus complete a full cycle of 360 electrical degrees, the capacitor 48 is charged to the same polarity as it was at the start of the commutation interval. This general type of control and commutation of inverter circuits is disclosed in greater detail by the said McMurray patent. When it is desired to stop operation of the inverter circuit 26, the control apparatus 54 responds to a suitable "stop" signal supplied by the apparatus of this invention or by other control means by withholding firing pulses after the commutation of one of the load rectifiers 35 and 36.

It will, of course, readily occur to those skilled in the art that the conduction of the gate controlled rectifiers of inverter circuits 28 and 30 are controlled in the same manner by firing signal pulses supplied thereto from the firing circuitry 54 over the connections 58 and 60. The alternating current thus supplied to Phases B and C by the inverter circuits 28 and 30, respectively, has the same frequency as the alternating current electric power supplied to Phase A, but the waveforms supplied to the three phases are displaced from one another in time by 120 electrical degrees as is customary in three-phase systems. In addition to controlling the fundamental frequency at which the alternating current power is supplied to the motor 13, the control apparatus 54 preferably includes means as taught by the aforesaid copending patent applications to control the average voltage by means of time-ratio-controlled switching of the gate controlled rectifiers of the circuits 26, 28 and 30.

Still referring to FIG. 1, the control apparatus of this invention will now be described. The d-c input junctions 22 and 24 to the power conversion apparatus 12 are connected to a voltage signal generater 70, which continuously monitors the voltage across the junctions 22 and 24 and the capacitor 20 and produces on an output conductor 72 an electric signal proportional to the voltage across the junctions 22 and 24. As indicated above, this voltage across the junctions 22 and 24 should not rise high enough to subject the gate controlled rectifiers and other circuit components to potentially destructive voltage levels. On the other hand, the voltage should not fall to a level at which the inverter commutating capacitors, such as 48, cannot be charged sufficiently to effect subsequent commutation. Accordingly, the control apparatus of the invention further includes an overvoltage signal generator 74 having an input 76 connected to the conductor 72 to receive the voltage signal therefrom and to produce at an output 78 an overvoltage signal when and only when the voltage across the junctions 22 and 24 exceeds a pre-established level as represented by the magnitude of the voltage signal on conductor 72. Similarly, the control apparatus also includes an undervoltage signal generator 80 having an input 82 connected to the conductor 72 for producing at an output 84 an undervoltage signal when and only when the voltage across the junctions 22 and 24 is less than a pre-established level.

Figure 2:
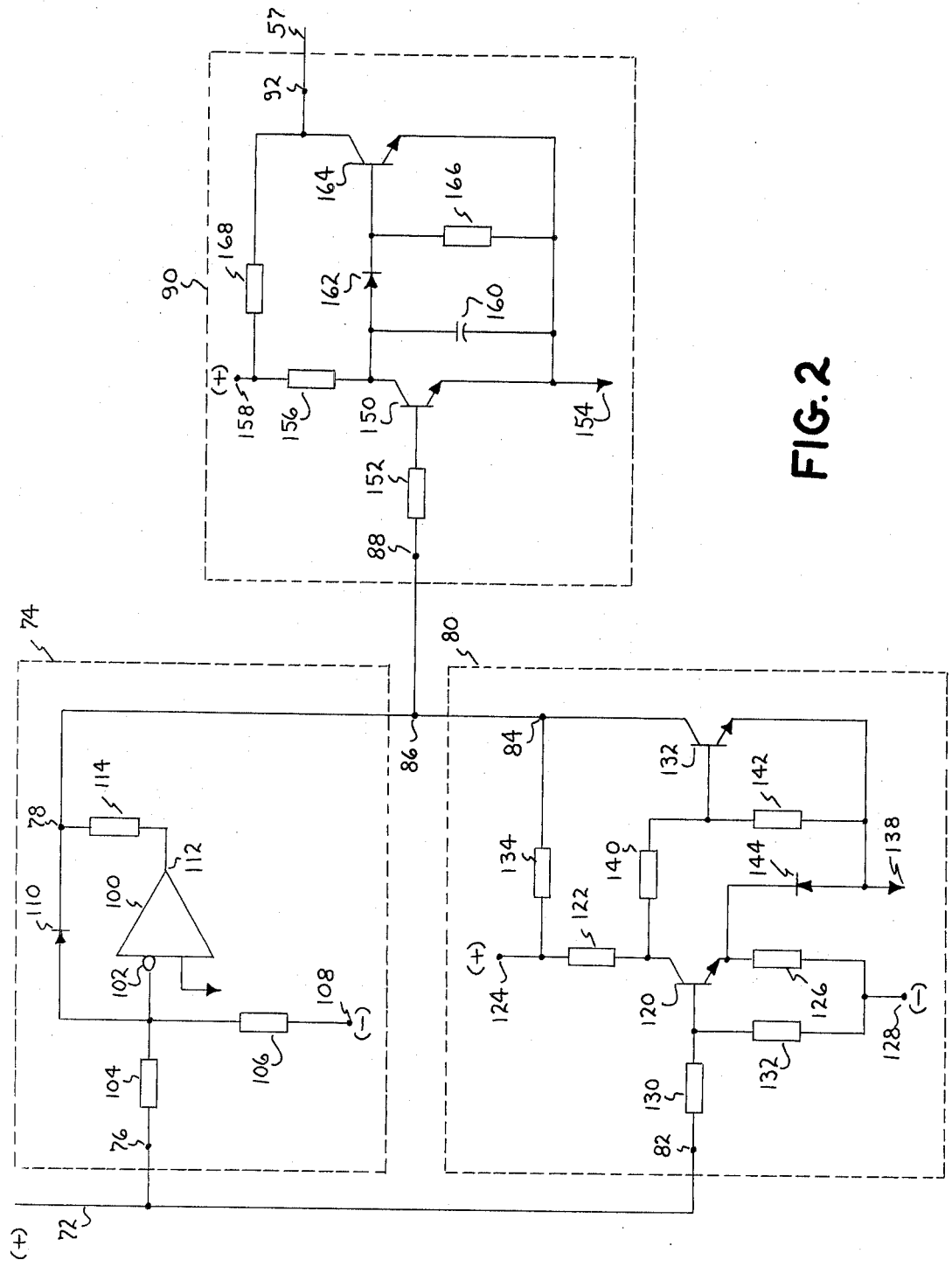
FIG. 2 is a circuit diagram of the voltage control means of FIG. 1.

Referring now to FIG. 2, the signal generators 74 and 80 of this invention will be described in detail. Turning first to the overvoltage signal generator 74, the function of this device is to produce an overvoltage signal if and only if the voltage across the junctions 22 and 24 exceeds the upper limit of an acceptable range, say 130 percent of the design voltage. As illustrated, the overvoltage signal generator 74 includes an inverting amplifier 100 having an input 102 connected to the input 76 of the signal generator 74 by a resistor 104. The input 102 is also connected through a resistor 106 to a source 108 of the d-c potential and through a diode 110 to the output 78 of the overvoltage signal generator 74. The output 112 of the amplifier 110 is also connected to output 78 by a resistor 114.

The voltage signal generating apparatus 70 (FIG. 1) is selected such that the voltage signal present on conductor 72 always has a positive magnitude representative of and proportional to the voltage across junctions 22 and 24 (FIG. 1), and the source 108 has a fixed negative potential. The values of the resistors 104 and 106 are selected such that the signal supplied to the input 102 of the amplifier 100 has a negative polarity so long as the voltage to the power conversion apparatus is equal to or less than the upper limit of the acceptable range. The negative signal at input 102 produces a positive output at 112 and, consequently, a positive signal at output 78 of the generator 74. When, however, the voltage to the power conversion apparatus exceeds the upper limit, the signal supplied to amplifier input 102 becomes positive, and the output signals at 112 and 78 change from positive to negative. It will thus be appreciated that a negative signal at output 78 is an overvoltage signal, and that a negative overvoltage signal is supplied to the summing junction 86. It will also be appreciated that the generator 74 is a snap action device in that a small change in the positive signal on conductor 72 will result in a signal transition from negative to positive polarity at input 102 and, due to the amplification of the amplifier 100, a change at output 78 from a substantial positive signal level to a substantial negative output.

Turning now to the undervoltage signal generator 80, the function of this device is to produce an undervoltage signal if and only if the voltage across the junctions 22 and 24 is less than the lower limit of an acceptable range, say 70 percent of the design voltage. As illustrated by FIG. 2, the undervoltage signal generator 80 includes an NPN transistor 120 having its collector connected through a resistor 122 to a source 124 of positive potential, its emitter connected through a resistor 126 to a source of negative potential 128, and its base connected through a resistor 130 to the input 82 of the signal generator 80. The base of the transistor 120 is also connected to the source 128 by a resistor 132. Another NPN transistor 132 has its collector connected through a resistor 134 to the positive source 124 and its emitter connected to common 138. The base of the transistor 132 is connected through resistor 140 to the collector of the transistor 120 and is connected through resistor 142 to common 138. To control thermal drift during operation, a diode 144 having its anode connected to common 138 is connected between common 138 and the emitter of the transistor 120.

The mode of operation of the undervoltage signal generator 80 will now be described. The values of the resistors 130 and 132 and the negative voltage of the source 128 are selected such that the signal supplied to the base of the transistor 120 has a positive magnitude sufficient to turn on the transistor 120 only so long as the voltage to the power conversion apparatus is equal to or greater than the lower limit of the acceptable voltage range. The circuit elements including the resistors 122 and 126 are selected such that the signal supplied to the base of the transistor 132 is insufficient to turn on the transistor 132 when the transistor 120 is conductive, but is sufficient to turn on the transistor 132 when the transistor 120 is not conducting. Assuming now that the voltage signal supplied to input 82 is sufficient to render transistor 120 conductive, transistor 132 will not conduct. As a result, a positive signal will be present at output 84 since it will then be connected to the source 124 through resistor 134. This output signal will have a substantially fixed value so long as the transistor 120 is conductive. If, however, the input voltage to the power conversion apparatus drops below the lower limit of the acceptable range, the signal supplied to the base of the transistor 120 will become insufficient to maintain conductance in the transistor 120. As a result, transistor 132 will become conductive, and output junction 84 will be connected to common point 138 through the transistor 132 and the output signal at 84 will drop from a substantial positive level to substantially that of common point 138. This lower level signal is supplied to the summing point 86 as an undervoltage signal. As in the case of the overvoltage signal generator 74, the undervoltage signal generator 80 is a snap action device in that a small change in the positive signal on conductor 72 will result in substantial signal change at output 84.

From the foregoing, it will be appreciated that the summing junction 86 receives positive signals from both the overvoltage signal generator 74 and the undervoltage signal generator 80 when the input voltage to the power conversion apparatus 12 is within the acceptable range. This combined signal has a substantial positive magnitude and is supplied to the input 88 of the "stop" signal generator 90 as a "within-range" signal. If the voltage signal on conductor 72 changes to indicate a departure of the voltage from the acceptable range, the appropriate generator 74 or 80 will produce its lower level signal. The lower level signal from either of the generators 74 and 80 will, when combined with the higher level signal from the other generator at the summing point 86, produce a signal having a magnitude substantially less than that of a "within-range" signal. This lower level signal is supplied to the input 88 of the "stop" signal generator as an "out-of-range" signal. The resistor 114 at the output of amplifier 100 prevents the positive signal at output 78 of generator 74 from ever becoming large enough to produce a "within-range" signal at 88 when a lower level signal is generated by the generator 80. Similarly, the voltage of the source 124 and the resistor 134 are selected such that a positive signal at 84 cannot override a negative signal at 78 to produce a "within-range" signal at input 88.

From the foregoing, it will be seen that the generators 74 and 80 are snap action devices that function similarly, but at opposite ends of an acceptable voltage range as represented by changes in the magnitude of a positive signal on conductor 72. The circuits employed by the generators 74 and 80 are representative of the broad range of devices capable of performing the functions of the generators. It will, of course, occur to those skilled in the art that a circuit of the type utilized in generator 74 could be used in the generator 80, and vice versa, and it will also be apparent that the functions of the two generators 74 and 80 could be combined into a dual purpose circuit in which common elements are utilized in the generation of both overvoltage and undervoltage signals.

Turning attention now to the stop signal generator 90 as illustrated by FIG. 2, the generator 90 includes an NPN-transistor 150 having its base connected through a resistor 152 to the input 88, its emitter connected to common point 154, and its collector connected through a resistor 156 to a source 158 of positive d-c potential. A capacitor 160 is connected between the emitter and the collector of transistor 150, and a diode 162 has its anode connected to the collector of the transistor 150 and its cathode connected to the base of a transistor 164. The base of the transistor 164 is also connected through a resistor 166 to the common point 154. The collector of the transistor 164 is connected through resistor 168 to the source 158 and directly to output 92. The emitter of the transistor 164 is connected to the common point 154.

Let it now be assumed that a positive "within-range" signal is supplied to input 88 of generator 90. Resistor 152 is selected such that a "within-range" signal at 88 will be sufficient to turn-on the transistor 150. Conduction of transistor 150 will essentially connect the base of the transistor 164 to the common point 154, the result being non-conduction of the transistor 164. With the transistor 164 turned-off, the output 92 is connected through resistor 168 to the positive source 158, and a positive signal is therefore present at output 92 and is supplied to the main control apparatus 54 (FIG. 1) over conductor 57. This positive or HIGH signal is recognized by the main control apparatus 54 as an "operate" signal. If, however, a lower level "out-of-range" signal is supplied to input 88, the signal present at the base of the transistor 150 will be insufficient to maintain conductance through the transistor 150. As a result, a positive signal sufficient to turn on the transistor 164 is supplied from source 158 through resistor 158 and diode 162 to the base of the transistor 164. Conduction of the transistor 164 will cause the potential at output 92 to drop to approximately that of the common point 154. The lower level or LOW signal then transmitted over conductor 57 to the main control apparatus 54 (FIG. 1) will be recognized as a "stop" signal, and the operation of the power conversion equipment may be stopped in an orderly fashion in the manner described and claimed by copending patent application Ser. No. 172,118, for "Firing Signal Transmission Control Means for Inverter Circuits," filed on Aug. 16, 1971, in the name of Carlton E. Graf and assigned to the assignee of this invention.

Unlike some operating parameters, voltage may change relatively slowly in inverter circuits as described herein, and there is generally no necessity for an emergency type stop when either an overvoltage or an undervoltage condition is detected. Recognizing this characteristic, the capacitor 160 is provided in the "stop" signal generator 90. The function of the capacitor 160 is to store electrical energy and thereby delay slightly the change in conduction of the transistor 164 (and the change in signal level at output 92) resulting from a change in the signal level at input 88. As a result, a momentary overvoltage and undervoltage condition will be reflected by the generation of an "out-of-range" signal at input 88, but not by a "stop" signal at output 92.

The control apparatus of this invention may be utilized for monitoring operating parameters other than voltage and stopping operation or otherwise altering operation of the power system in the event that the selected parameter departs from a pre-established range. In fact, the broader aspects of the present invention are applicable in electric systems other than the illustrated and described inverter system. When used, however, for monitoring parameters other than voltage, it may be necessary or desirable to make appropriate changes. For example, since voltage normally changes relatively slowly, the normal stopping procedure for the electrical system may be utilized when an out-of-range voltage condition is detected. When, however, monitoring a fast changing parameter, such as current, it may be desirable to utilize some sort of emergency stopping procedure, such as that described in copending patent application Ser. No. 162,575 for "Short Circuit Protection Means for Power Circuits," filed on July 14, 1971, in the name of Einar A. Skogsholm and assigned to the assignee of this invention.

In summary, the present invention provides means for monitoring a selected operating parameter, preferably voltage, in an electrical power system and automatically stopping or otherwise altering the operation of the power system whenever the selected parameter departs from a pre-established range.

While the invention has been particularly shown and described with reference to a preferred embodiment thereof, it will be understood by those skilled in the art that various changes in form, details, and application may be made therein without departing from the spirit and scope of the invention. For example, it has been pointed out above that the overvoltage and undervoltage generators can take on forms differing from those illustrated. Accordingly, it is intended that all such modifications and changes be included within the scope of the appended claims.

What is claimed as new and is desired to secure by letters patent of the United States is:

1. In an electric system including power conversion means for convertibly transmitting electric power between a source and a load, control means to automatically stop the operation of the power conversion means in response to the departure of a selected operating parameter from a pre-established range having upper and lower limits, said control means comprising:

first means coupled to the electrical system for generating an electrical signal representative of the selected operating parameter, second means coupled to said first means for receiving therefrom the signal representative of the selected parameter and being responsive thereto to generate an out-of-range signal when the operating parameter is either greater than the upper limit of said range or less than the lower limit of said range, and third means including signal generating means having an input coupled to said second means and an output, said signal generating means producing at said output an "operate" signal in the absence of an "out-of-range" signal at said input and a "stop" signal in the presence of an "out-of-range" signal at said imput, said third means being coupled to the power conversion means and being responsive to a "stop" signal to stop the operation of the power conversion means, said signal generating means further comprising:

first resistive circuit means connected across a source of electric power, said first circuit means including first switching means having a conductive state and a non-conductive state, said output coupled to a predetermined point in said first circuit means at which a substantial electrical change occurs when the state of said first switching means is changed, said "operate" signal being produced when said first switching means is in a first one of its states and said "stop" signal being produced when said first switching means is in the other one of its states, second resistive circuit means connected across a source of electric power, said second circuit means including second switching means having a conductive state and a non-conductive state, said first switching means coupled to a predetermined point in said second circuit means at which a substantial electrical change occurs when the state of said second switching means is changed, said first switching means assuming its first state when said second switching means is in a first one of its states and said first switching means assuming its second state when said second switching means is in the other one of its states, and means coupled to said input and said second switching means for shifting said second switching means between its first and second states in response to signals from said second means, said shifting means maintaining said second switching means in its first state in the absence of an "out-of-range" signal at said input and in its other state in the presence of an "out-of-range" signal at said input.

2. Control means as defined by claim 1 in which said signal generation means of claim 1 further comprises delay means to prevent shifting of said first switching means between its states in response to a signal change at said input of less than a predetermined duration.

3. Control means as defined by claim 1 in which said first and second switching means are transistors, the base of said first transistor being connected to said predetermined point in said second circuit means and the base of said second transistor being connected to said input to selectively render said transistors conductive and non-conductive by means of electrical signals supplied to their bases.

4. Control means as defined by claim 3 further comprising a capacitor connected in parallel across said second transistor to prevent shifting of said first switching means between its states in response to a signal change at said input of less than a predetermined duration.

5. Control means as defined by claim 4 in which said second means further comprises:

overlimit signal generating means having an input coupled to said first means and an output, said overlimit signal generating means producing an overlimit signal when and only when the operating parameter is greater than the upper limit of said range, underlimit signal generating means having an input coupled to said first means and an output, said underlimit signal generating means producing an underlimit signal when and only when the operating parameter is less than the lower limit of said range, and summing means coupled to said outputs of said overlimit and underlimit signal generating means and the input of said third means for supplying an "out-of-range" signal to said third means when and only when an overlimit signal or an underlimit signal is supplied thereto.

6. Control means as defined by claim 5 in which said overlimit and underlimit signal generating means are snap action electrical devices.

7. An a-c adjustable speed drive system comprising:

a polyphase a-c motor, power conversion means for convertibly transmitting electric power between a d-c source and said polyphase a-c motor, said power conversion means including a plurality of output phases each connected to a respective phase of said motor, voltage signal generating means for generating an electrical signal representative of the voltage of the unidirectional electric power supplied to said power conversion means, overvoltage signal generating means coupled to said voltage signal generating means for receiving therefrom the signal representative of the voltage to said power conversion means and being responsive thereto to produce an output signal of a first level when the voltage is equal to or less than a first pre-established level and an output signal of a second level when the voltage is greater than said first pre-established level, an output signal of said second level indicating that an overvoltage condition exists in said power conversion means, undervoltage signal generating means coupled to said voltage signal generating means for receiving therefrom the signal representative of the voltage to said power conversion means and being responsive thereto to produce an output signal of a first level when the voltage signal is equal to or more than a second predetermined level and an output signal of a second level when the voltage signal is less than said second pre-established level, an output signal of said second level indicating that an undervoltage condition exists in said power conversion means, said first pre-established voltage signal level being substantially greater than said second pre-established voltage signal level and said first and second pre-established voltage signal levels being selected such that output signals of first levels will be produced by both of said overvoltage and undervoltage signal generating means during normal operation of said power conversion means, and means coupled to said overvoltage and undervoltage signal generating means and said power conversion means for receiving output signals from said overvoltage and undervoltage signal generating means and being responsive thereto to stop the operation of the power conversion means when and only when an output signal of a second level is supplied thereto.

8. A drive system as defined by claim 7 in which said overvoltage and undervoltage signal generating means are snap action electrical devices whereby a small change in the voltage signal across either of said first and second pre-established voltage signal levels causes a rapid change in the respective output signal between its two levels.

9. A drive system as defined by claim 8 in which said means for stopping the operation of the power conversion means comprises signal generating means having an input coupled to said overvoltage and undervoltage signal generating means and an output coupled to said power conversion means, said signal generating means being an electrical device producing at its output an "operate" signal when only signals of a first level are supplied to its input and a "stop" signal when a signal of a second level is supplied to its input.

10. A drive system as defined by claim 9 in which said means for stopping the operation of the power conversion means includes delay means for preventing a change in the signal produced at its output in response to a change in signal level at its input of less than a predetermined duration.

11. A drive system as defined by claim 10 in which said delay means is an electrical energy storage device.

* * * * *